(12) United States Patent
Blake

(10) Patent No.: US 8,438,095 B1
(45) Date of Patent: May 7, 2013

(54) APPARATUSES, METHODS AND SYSTEMS FOR AN INFLATION-SENSITIVE INDEX AND ASSOCIATED FINANCIAL PRODUCT GENERATOR

(75) Inventor: Timothy W. Blake, New York, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 11 days.

(21) Appl. No.: 13/183,395

(22) Filed: Jul. 14, 2011

Related U.S. Application Data

(60) Provisional application No. 61/364,328, filed on Jul. 14, 2010.

(51) Int. Cl.
*G06Q 40/00* (2012.01)

(52) U.S. Cl.
USPC ..................................................... 705/36 R

(58) Field of Classification Search ............... 705/36 R
See application file for complete search history.

(56) References Cited

U.S. PATENT DOCUMENTS

| | | | |
|---|---|---|---|
| 7,660,762 B1 * | 2/2010 | Mellina ........................... | 705/37 |
| 2002/0091625 A1 * | 7/2002 | Blauvelt et al. .................. | 705/37 |
| 2005/0234795 A1 * | 10/2005 | Hodes et al. .................... | 705/36 |
| 2006/0080250 A1 * | 4/2006 | Hansen et al. .................. | 705/42 |

\* cited by examiner

*Primary Examiner* — Olabode Akintola
(74) *Attorney, Agent, or Firm* — Kenneth L. Johnson; Chadbourne & Parke LLP

(57) ABSTRACT

The APPARATUSES, METHODS AND SYSTEMS FOR AN INFLATION-SENSITIVE INDEX AND ASSOCIATED FINANCIAL PRODUCT GENERATOR ("ISIG") provides facilities for generating and managing inflation-sensitive financial indices and/or the associated portfolios of investment vehicles underlying them, as well as for constructing tradable financial products based on and/or otherwise influenced by the values of those indices. In one embodiment, the ISIG may generate, maintain and/or manage at least three indices and/or financial products based thereon (e.g., such as index-linked exchange traded funds, and/or the like): a long-term inflation index that depends on the long term inflation expectations embedded in the U.S. Government bond market; a long-term TIPS index, that tracks an investment in the longest TIPS in the marketplace, the 30 year TIPS bond, that may roll to on-the-run series according to a predefined roll schedule; and a long-term treasury index that tracks an investment in the longest maturity sector for government bonds with the price transparency and liquidity of a futures contract.

16 Claims, 12 Drawing Sheets

US 8,438,095 B1

APPARATUSES, METHODS AND SYSTEMS FOR AN INFLATION-SENSITIVE INDEX AND ASSOCIATED FINANCIAL PRODUCT GENERATOR

RELATED APPLICATIONS

Applicant hereby claims priority under 35 USC §119 for U.S. provisional patent application Ser. No. 61/364,328 filed Jul. 14, 2010, entitled "APPARATUSES, METHODS AND SYSTEMS FOR AN INFLATION-SENSITIVE INDEX AND ASSOCIATED FINANCIAL PRODUCT GENERATOR,"

The entire contents of the aforementioned application are herein expressly incorporated by reference.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present invention is directed generally to apparatuses, methods, and systems of finance, and more particularly, to APPARATUSES, METHODS AND SYSTEMS FOR AN INFLATION-SENSITIVE INDEX AND ASSOCIATED FINANCIAL PRODUCT GENERATOR.

BACKGROUND

Inflation is the rate of change in the relative purchase power of money, or equivalently the price of goods and services, over time. Metrics such as the consumer price index and the retail price index have come about to track the cumulative prices of one or more select baskets of goods and/or services over time in order to gain some measure of the amount of inflation in an economy. Inflation may be considered by investors in making various kinds of investments, inasmuch as it may affect the actual value of an investment or amount of returns received. For example, a quantity of money invested in a low-interest bank account may actually be losing value over time if the interest rate on the account is outpaced by the inflation rate. Some financial instruments, such as Treasury Inflation-Protected Securities (TIPS) have come about to provide investment opportunities that neutralize any adverse inflationary effects.

SUMMARY

The APPARATUSES, METHODS AND SYSTEMS FOR AN INFLATION-SENSITIVE INDEX AND ASSOCIATED FINANCIAL PRODUCT GENERATOR (hereinafter "ISIG") provides facilities for generating and managing inflation-sensitive financial indices and/or the associated portfolios of investment vehicles underlying them, as well as for constructing tradable financial products based on and/or otherwise influenced by the values of those indices. In one embodiment, the ISIG may generate, maintain and/or manage at least one of the following at least three indices and/or financial products based thereon (e.g., such as index-linked exchange traded funds, and/or the like): a long-term inflation index that depends on the long term inflation expectations embedded in the U.S. Government bond market; a long-term TIPS index, that tracks an investment in the longest TIPS in the marketplace, the 30 year TIPS bond, that may roll to on-the-run series according to a predefined roll schedule; and a long-term treasury index that tracks an investment in the longest maturity sector for government bonds with the price transparency and liquidity of a futures contract.

BRIEF DESCRIPTION OF THE DRAWINGS

The accompanying appendices and/or drawings illustrate various non-limiting, example, inventive aspects in accordance with the present disclosure.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Isig

This disclosure describes apparatuses, methods and systems for an inflation-sensitive index and associated financial product generator ("ISIG"). It is to be understood that, depending on the particular needs and/or characteristics of an ISIG user, financial product issuer, applicable market, market data source(s), index configuration, financial advisor, individual and/or enterprise user, database configuration and/or relational model, data type, data transmission and/or network framework, syntax structure, and/or the like, various embodiments of the ISIG may be implemented that enable a great deal of flexibility and customization. The instant disclosure discusses embodiments and/or applications of the ISIG directed to generating, managing, administrating and/or disseminating inflation-sensitive indices, their underlying portfolios and/or associated financial products. However, it is to be understood that the apparatuses, methods and systems discussed herein may be readily adapted and/or reconfigured for a wide variety of other applications and/or implementations. For example, aspects of the ISIG may be adapted for both and/or either long and/or short positions on inflation, tracking modified inflationary indices, multiple and/or foreign inflation rates, generating financial products with different positions with respect to inflationary futures, and/or the like. Furthermore, aspects of the Platform may be configured to generate, administer, and/or manage a wide variety of different financial instruments, securities, and/or the like beyond specific embodiments and/or implementations described in detail herein. For example, indices discussed herein may underly and/or be linked to any of a wide variety of financial products, derivatives, instruments, and/or the like, such as but not limited to: equities, debts, derivatives, notes (e.g., structured notes), stocks, preferred shares, bonds, treasuries, debentures, options, futures, swaps, rights, warrants, commodities, currencies, funds, long and/or short positions, ETFs, insurance and/or risk transfer agreements, annuities, and/or other assets or investment interests. In one implementation, ISIG generated indices tracking inflation of various foreign currencies may be used to instruct weights in a basket of currencies designed to maximize returns based on market expectations of international inflationary distributions and relative currency values. It is to be understood that the ISIG may be further adapted to other implementations and/or investment, finance and/or risk management applications.

Figure 1:
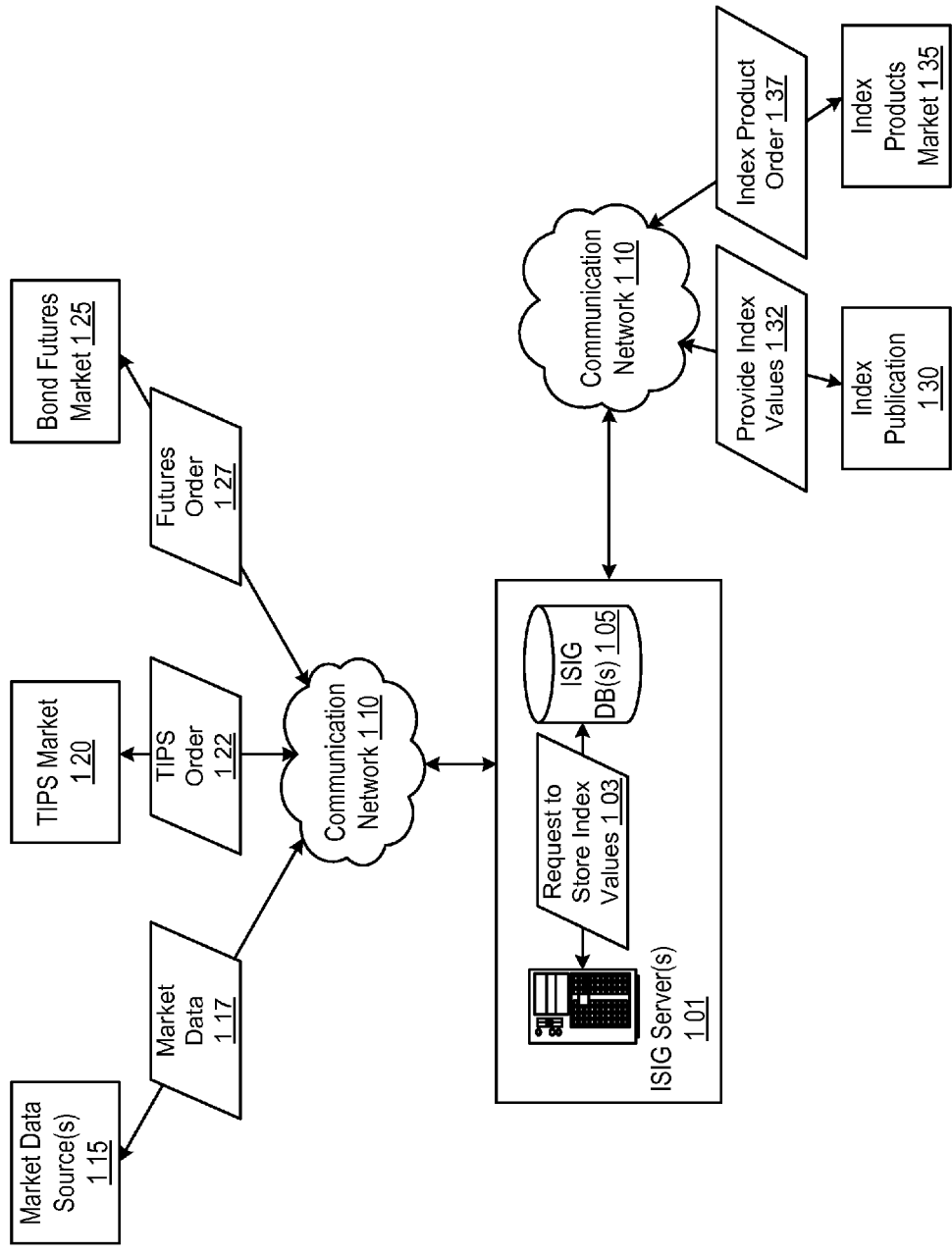
FIG. 1 shows a schematic illustration of data flows between ISIG components and affiliated entities in one embodiment of ISIG operation.

FIG. 1 shows a schematic illustration of data flows between ISIG components and affiliated entities in one embodiment of ISIG operation. The ISIG may, in one implementation, comprise an entity including one or more ISIG servers 101 implementing ISIG functionality and communicatively coupled to one or more ISIG databases ("DBs") 105 configured to store ISIG data. The ISIG server 101 may be further coupled by a communication network 110 to one or more market data sources 115, such as one or more market data feeds (e.g., Bloomberg's PhatPipe, Dun & Bradstreet, Reuter's Tib, Triarch, and/or the like) to draw financial data used in the generation and maintenance of ISIG indices. A wide variety of different data may be drawn, such as but not limited to the price of the on-the-run ("OTR") 30 year TIPS bond, the price of the shortest term quarterly Long-Term "Ultra" U.S. Treasury Bond Futures contract, and/or the like. For example, market data may be obtained 117 as a quote in XML format substantially in the following form:

<XML>
      <Quote>
        <InstrumentType>TIPS Bond</InstrumentType>
        <Symbol>TIPS1</Symbol>
        <LastPrice>$1,005.06</LastPrice>
        <LastPriceTime>20110711-10:10:00</LastPriceTime>
      </Quote>
    </XML>

ISIG systems may process received market data to generate index values and/or to determine allocations of funds underlying indices to various investments, such as but not limited to OTR 30 year TIPS bonds and/or shortest term quarterly Long-Term "Ultra" U.S. Treasury Bond Futures contracts. In an implementation where the instruments underlying an ISIG index are to be actually obtained, orders for such investments at the determined levels may be placed and/or instructed by ISIG systems with one or more TIPS market 120 and/or Bond Futures market 125 exchanges and/or outlets, such as may include one or both of primary and secondary markets. For example, a TIPS order may be placed 122 via Financial Information eXchange (FIX) API using FIX messages substantially in the following form:

8=FIX.5.0|9=140|35=D|49=Firm1|56=Firm2|34=
    101|11=Order1|55=TIPS1|54=1|
    52=20110711-10:10:10|60=20110711-10:10:
    10|38=100|40=1|10=111

The above message indicates that it is in FIX 5.0 format, it is sent by Firm1 to buy 100 shares of TIPS bonds TIPS1 from Firm2. In another example, a futures order may be placed 127 via FIX API using FIX messages substantially in the following form:

8=FIX.5.0|9=142|35=D|49=Firm1|56=Firm3|34=
    102|11=Order2|55=Futures1|54=5|
    52=20110711-10:10:11|60=20110711-10:10:
    11|38=100|40=1|10=121

The above message indicates that it is in FIX 5.0 format, it is sent by Firm1 to sell short 100 shares of bond futures Futures1 to Firm3. In the above messages, a number on the left side of an equal sign represents a field and fields are separated by a "|" symbol. The numbers in the above messages correspond to the following fields: BeginString(8), BodyLength(9), MsgType(35), SenderCompID(49), TargetCompID(56), MsgSeqNum(34), ClOrdID(11), Symbol(55), Side(54), SendingTime(52), TransactTime(60), OrderQty(38), OrdType(40), CheckSum(10). In another implementation, indices may be based on portfolios that are simulated, synthetic, and/or the like. In such an implementation, orders may still be placed and/or instructed by ISIG systems with one or more TIPS market 120 and/or Bond Futures market 125 exchanges and/or outlets in order to effectuate the generation and/or transaction of financial products and/or instruments based on ISIG generated indices.

Index values associated with the portfolio of investments, real or synthetic, that are generated and/or administered by the ISIG server 101 may be stored in the ISIG DB 105 for future retrieval, display, report generation, updating, and/or the like. For example, index values may be stored 103 via a SQL statement substantially in the following form:

INSERT INTO IndexValuesTable (IndexID, IndexValue,
    IndexValueTime
    VALUES ('index ID', 'index value', 'time when index
    value was in effect')

In one implementation, the ISIG may further provide index values via a communication network 110 for publication 130, such as on a website, market data resource, ticker, report, and/or the like. For example, such index values may be provided 132 by retrieving them from the ISIG DB 105 via a SQL statement substantially in the following form:

SELECT IndexValue, IndexValueTime
    FROM IndexValuesTable
    WHERE IndexID='index ID'

The ISIG may further be configured to generate and/or instruct the generation of one or more financial instruments and/or products with values linked to the value of one or more ISIG generated indices. Such instruments and/or products may include, but are not limited to, equities, debts, derivatives, notes (e.g., structured notes), stocks, preferred shares, bonds, treasuries, debentures, options, futures, swaps, rights, warrants, commodities, currencies, funds, long and/or short positions, ETFs, insurance and/or risk transfer agreements, annuities, and/or other assets or investment interests. ISIG generated instruments and/or products may then be made available for purchase in one or more index products markets 135. For example, an index product order may be placed 137 via FIX API using FIX messages substantially in the following form:

8=FIX.5.0|9=150|35=D|49=Firm1|56=Firm4|34=
    103|11=Order3|55=IndexProduct1|54=2|

52=20110711-10:20:10|160=20110711-10:20:
10|38=50|40=1|10=132

The above message indicates that it is in FIX 5.0 format, it is sent by Firm1 to sell 50 shares of index product IndexProduct1 to Firm4.

Figure 2:
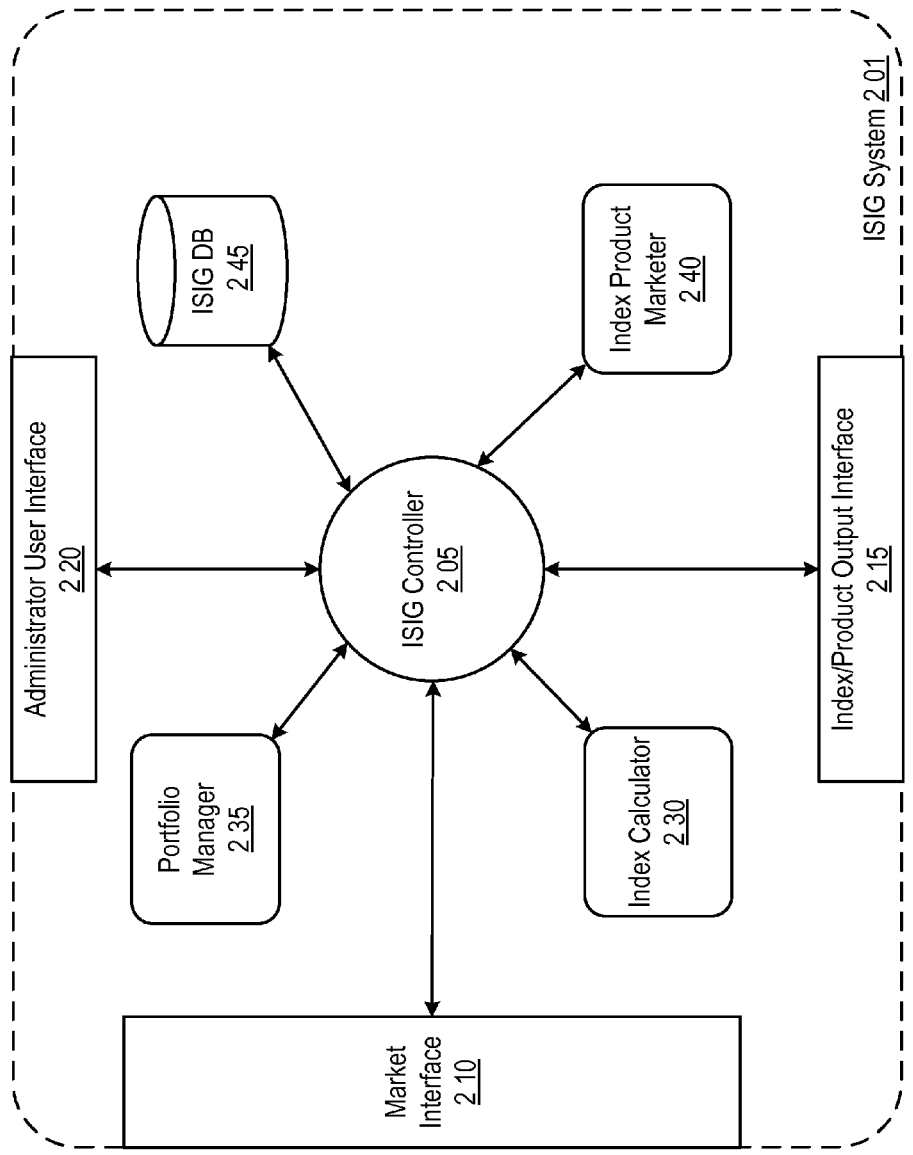
FIG. 2 shows aspects of ISIG system architecture in block-diagram form and data flow between and among ISIG system components in one embodiment of ISIG operation.

FIG. 2 shows aspects of ISIG system architecture in block-diagram form and data flow between and among ISIG system components in one embodiment of ISIG operation. An ISIG system 201 may include a number of operational modules and/or data stores configured to carry out ISIG features and/or functionality. An ISIG controller 205 may serve a central role in some embodiments of ISIG operation, serving to orchestrate the reception, generation and distribution of data and/or instructions to, from and between ISIG modules and/or allow further analysis of data generated during ISIG operation. The ISIG controller 205 may be coupled to one or more operational modules configured to implement various features associated with embodiments of ISIG operation. In one implementation, the ISIG controller 205 may be coupled to a market interface 210 configured to query and/or draw market data from one or more market data sources and/or feeds; place market orders and/or otherwise effectuate market transactions; receive confirmations of requested instrument transaction fulfillment; and/or the like. In one implementation, the ISIG controller 205 may further be coupled to an index/product output interface 215, which may be configured to publish index values; generate and/or instruct the generation of reports containing index values and/or the values of associated financial products; generate and/or instruct the generation of financial products with values linked to ISIG generated index values; provide ISIG financial products for sale on one or more markets and/or exchanges; and/or the like. In one implementation, the ISIG controller 205 may further be coupled to an administrator user interface 220 configured to provide an interface through which an administrator can monitor and/or interact with ISIG system settings and portfolio allocations, manage data, and/or the like. For example, in one implementation, an ISIG administrator may interface with the ISIG system via the administrator user interface to adjust the values of index calculation and/or publication times and/or other parameters associated therewith, as may be needed and/or desired within a given application of the ISIG system.

In one implementation, the ISIG controller 205 may further be coupled to an index calculator module 230 configured to calculate the official index closing value. In one implementation, the closing value may be calculated on a daily basis, such as at the end of each U.S. trading day. In one implementation, daily index closing values may be calculated based on end-of-day trader marks on the TIPS bond and the official Chicago Mercantile Exchange settlement price on the futures contract at a specified time (e.g., 3:00 PM EST) and/or at a time that conforms to bond market trading practice on a given day. The index calculator 230 may also be configured to track and/or monitor values of components of one or more underlying real and/or simulated ISIG portfolios and calculate index values based thereon. In one implementation, the index calculator may be configured to calculate values associated with a Long-Term Inflation (LTI) index, configured to reflect changes in the long term inflation expectations embedded in the U.S. Government bond market. In one implementation, the index calculator may be configured to calculate values associated with a Long-Term TIPS (LTTP) index, configured to track the value of an investment in the 30 year TIPS bond that rolls to OTR series according to a predefined rolling schedule. In one implementation, the index calculator may be configured to calculate values associated with a Long-Term Treasury (LTTS) index, configured to track the price returns of the Ultra-Long U.S. Bond Futures, coupled with a money market return of investing in the Federal Funds Market.

In one implementation, the ISIG controller 205 may further be coupled to a portfolio manager module 235 configured to manage one or more portfolios of financial instruments and/or investments underlying one or more ISIG indices. Such portfolios may, in various implementations, comprise actual investments and/or be simulated and/or synthetic portfolios with values tied to specified investments. In one implementation, the portfolio manager module may be configured to administer a portfolio underlying the LTI index and comprising balanced investments in the 30-year TIPS bond and the Ultra-Long U.S. Bond Futures contract. In one implementation, the portfolio manager module may be configured to administer a portfolio underlying the LTTP index and comprising rolling investments in the 30-year TIPS bond, that rolls to OTR series bonds according to a pre-defined roll schedule. In one implementation, the portfolio manager module may be configured to administer a portfolio underlying the LTTS index and comprising investments in Ultra-Long U.S. Bond Futures, coupled with a money market return of investing in the Federal Funds Market.

In one implementation, the ISIG controller 205 may further be coupled to an index product marketer module 240 configured to generate, market, manage, and/or the like financial products and/or instruments with values tied to one or more ISIG indices. In various implementations, the index product marketer module may be configured to generate and manage any of a wide variety of different financial products, such as but not limited to: equities, debts, derivatives, notes (e.g., structured notes), stocks, preferred shares, bonds, treasuries, debentures, options, futures, swaps, rights, warrants, commodities, currencies, funds, long and/or short positions, ETFs, insurance and/or risk transfer agreements, annuities, and/or other assets or investment interests. In one implementation, the index product marketer module may initiate the formation of a corporation, special purpose entity, fund, and/or the like entity which owns a portfolio underlying an ISIG index and which issues shares with values tied to that index.

In one implementation, the ISIG controller 205 may further be coupled to one or more databases 245 configured to store a variety of data associated with ISIG operation in various embodiments. For example, in one implementation, the ISIG database may include tables for storing information associated with current and/or historical LTI, LTTP, and/or LTTS index values, underlying portfolios and/or portfolio elements, ISIG index linked financial products, market data, transaction orders, transaction histories, and/or the like. Further detail surrounding such tables is provided below.

Figure 3:
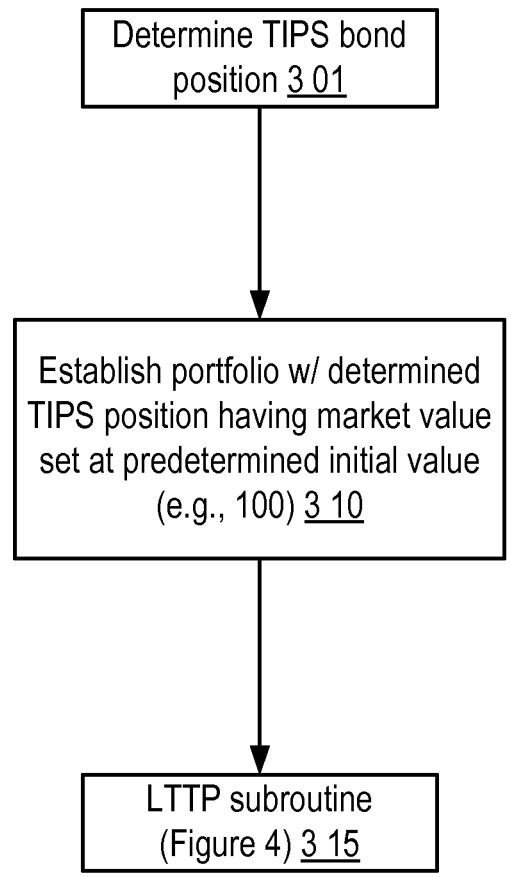
FIG. 3 shows aspects of logic flow for Long Term TIPS index generation and portfolio management in one embodiment of ISIG operation.

FIG. 3 shows aspects of logic flow for Long Term TIPS (LTTP) index generation and portfolio management in one embodiment of ISIG operation. In one implementation, an LTTP index may track an investment in the longest TIPS in the marketplace (e.g., the 30 year TIPS bond). The LTTP index may further, in one implementation, employ a specified roll-over protocol to the OTR series according to a pre-defined roll schedule. The LTTP index may be suitable for providing an accurate gauge for an inflation protected investment as the most interest rate sensitive instrument in the Treasury universe. The ISIG may determine an initial TIPS bond position 301, such as may comprise a selection of one or more bonds, TIPS bonds (e.g., OTR 30 year TIPS bonds), and/or the like for composing a portfolio to underlying and/or inform the value of an LTTP index. The ISIG may then establish a portfolio, which in various implementations may be real, simulated, synthetic, and/or the like, based on the determined position, having a market value set at a predetermined initial value 310. In one implementation, the initial value of the index on its inception date may be normalized (e.g., set to 100). The ISIG may then undertake the LTTP subroutine shown in FIG. 4 315 to further manage the index and/or administer the portfolio underlying the index.

Figure 4:
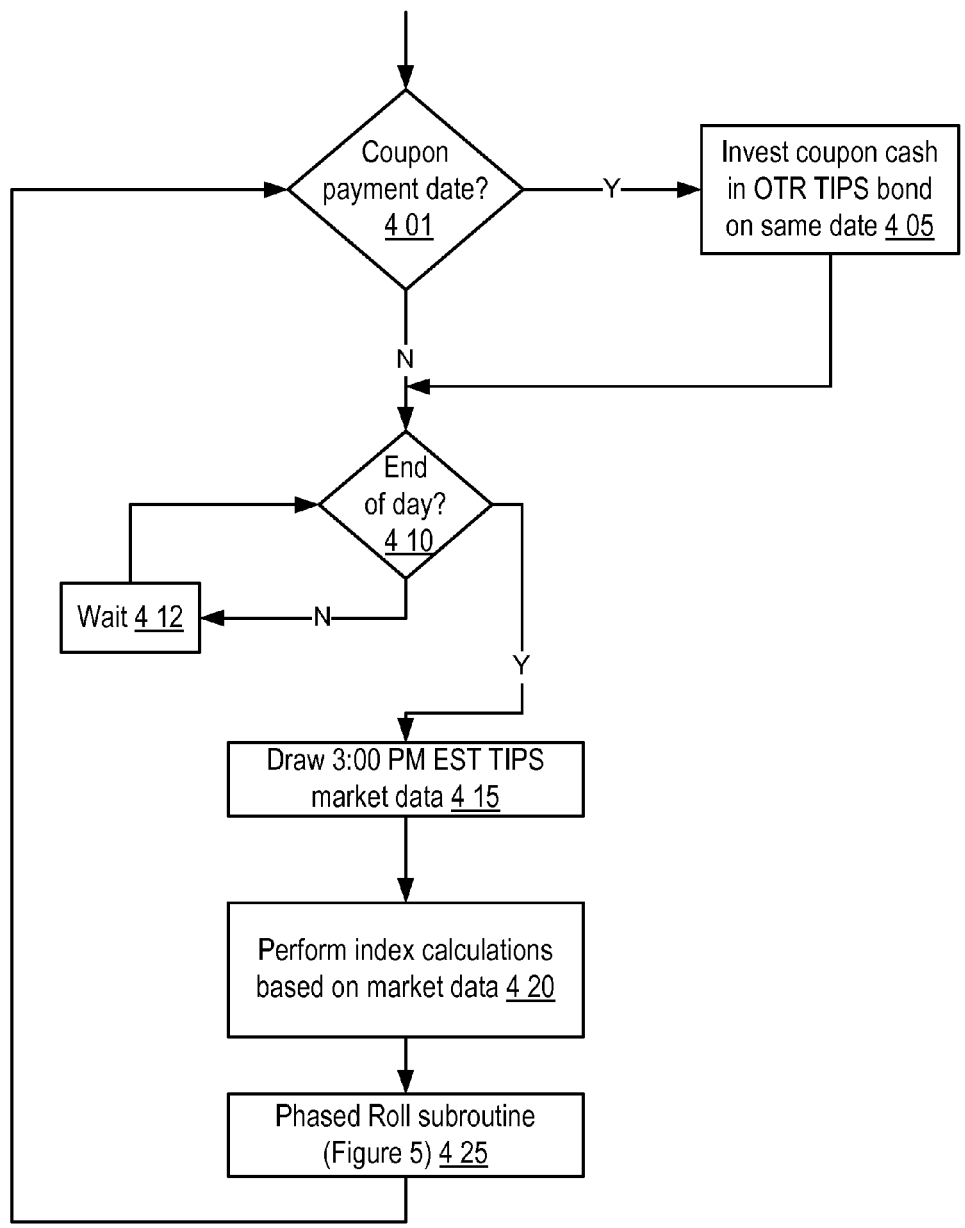
FIG. 4 shows aspects of logic flow for TIPS bond administration in one embodiment of ISIG operation.

FIG. 4 shows aspects of logic flow for TIPS bond administration in one embodiment of ISIG operation. A determination may be made as to whether the current date is a coupon payment date for the TIPS bonds underlying the index portfolio 401. If so, the coupon amount is reinvested in the OTR TIPS bonds (e.g., on the same date) 405. A determination may be made as to whether the end of the trading day has been reached (e.g., the close of trading of a specified exchange) 410. If not, then the ISIG may wait for a period of time 412 before checking again for the end of the day 410. Once the end of the day has been reached, market data from a pre-set time of day may be drawn (e.g., 3:00 PM EST on the same day) 415, and an index calculation may be performed based on the drawn market data to determine the latest value of the LTTP index, daily returns, and/or the like 420.

As noted above, in some embodiments, the ISIG may implement a roll-over protocol to periodically allocate LTTP portfolio investments in TIPS bonds that are OTR. During the (e.g., three month) roll periods (when the index is rolled into a new OTR bond) the bond portfolio of the index consists of two bonds—On-The-Run and Off-The-Run. In one implementation, the index value may be computed using the two bond portfolio. For the period between rolls, the formulas may be used with the notional of the Off-The-Run bond set to zero $N_b \text{off} = o$.

The month-to-date return of the index on $k^{th}$ business day of the month is the difference between the market value of the index on that day $M_I(k)$ and the market value of the index on the last business day of the previous month $M_I(o)$, normalized to $M_I(O)$:

$$R_I(k) = \frac{M_I(k) - M_I(0)}{M_I(0)}$$

where the market value of the index on a given day is defined as:

$$M_I(k) = N_b \text{on} S_b \text{on} P_b \text{on}(k) + N_b \text{off} S_b \text{off} P_b \text{off}(k)$$

where $P_b$, $S_b$, $N_b$ are bond's full price, bond size and number of bonds respectively, subscript on or off indicates on-the-run or off-the-run bond type.

The market TIPS price is computed off the quoted real yield with the interest accrued from the previous coupon payment not included in the price (clean price). To compute the full price of the bond on the $k^{th}$ day, in one implementation, the accrued interest (AI) may be added to the quoted clean price and the result may be multiplied by the current inflation ratio $I_{inflation}(k)$:

$$P_b(k) = [P_{quoted}(k) + AI(k)] * I_{inflation}(k)$$

Thus, if no coupon is paid during the period, the month-to-date return of the index on day k is:

$$R_I(k) = \frac{M_b(k) - M_b(0)}{M_b(0)} =$$

$$\frac{N_b \text{on} S_b \text{on}(P_b \text{on}(k) - P_b \text{on}(0)) + N_b \text{off} S_b \text{off}(P_b \text{off}(k) - P_b \text{off}(0))}{N_b \text{on} S_b \text{on} P_b \text{on}(0) + N_b \text{off} S_b \text{off} P_b \text{off}(0)}$$

where $P_b(O)$ is the price of the bond on the last business day of the previous month immediately after rebalancing, subscript on or off indicates whether it is on-the-run or off-the-run bond.

If a coupon is paid during the period, it is invested in OTR bond immediately based on the T+1 settlement guideline. If $k_c$ is the day for which bonds settle on the coupon payment day, on that day an additional amount of $N_b S_b C I_{inflation}(k_c)$ is invested in the OTR bond (where C is the coupon payment in dollars) and the new additional number of bonds in the index $\Delta N_b \text{on}$, can be computed from:

$$\Delta N_b \text{on} S_b \text{on} P_b \text{on}(k_c) = N_b(o) S_b C I_{inflation}(k_c)$$

Thus, the new number of OTR bonds is:

$$N_b \text{on}(k_c) = N_b \text{on}(o) + \Delta N_b \text{on}$$

And the index month-to-date return between coupon payment date and the next rebalancing date is:

$$R_I(k) = \frac{\begin{array}{c}N_b \text{on}(k_c) S_b \text{on} P_b \text{on}(k) - N_b \text{on}(0) S_b \text{on} P_b \text{on}(0) + \\ N_b \text{off} S_b \text{off}(P_b \text{off}(k) - P_b \text{off}(0))\end{array}}{N_b \text{on}(0) S_b \text{on} P_b \text{on}(0) + N_b \text{off} S_b \text{off} P_b \text{off}(0)}$$

The daily return of the index is computed from two consecutive month-to-date returns $R_b(k-1)$ and $R_b(k)$ as:

$$R_I(k-1, k) = \frac{R_I(k) + 1}{R_I(k-1) + 1} - 1$$

Figure 5:
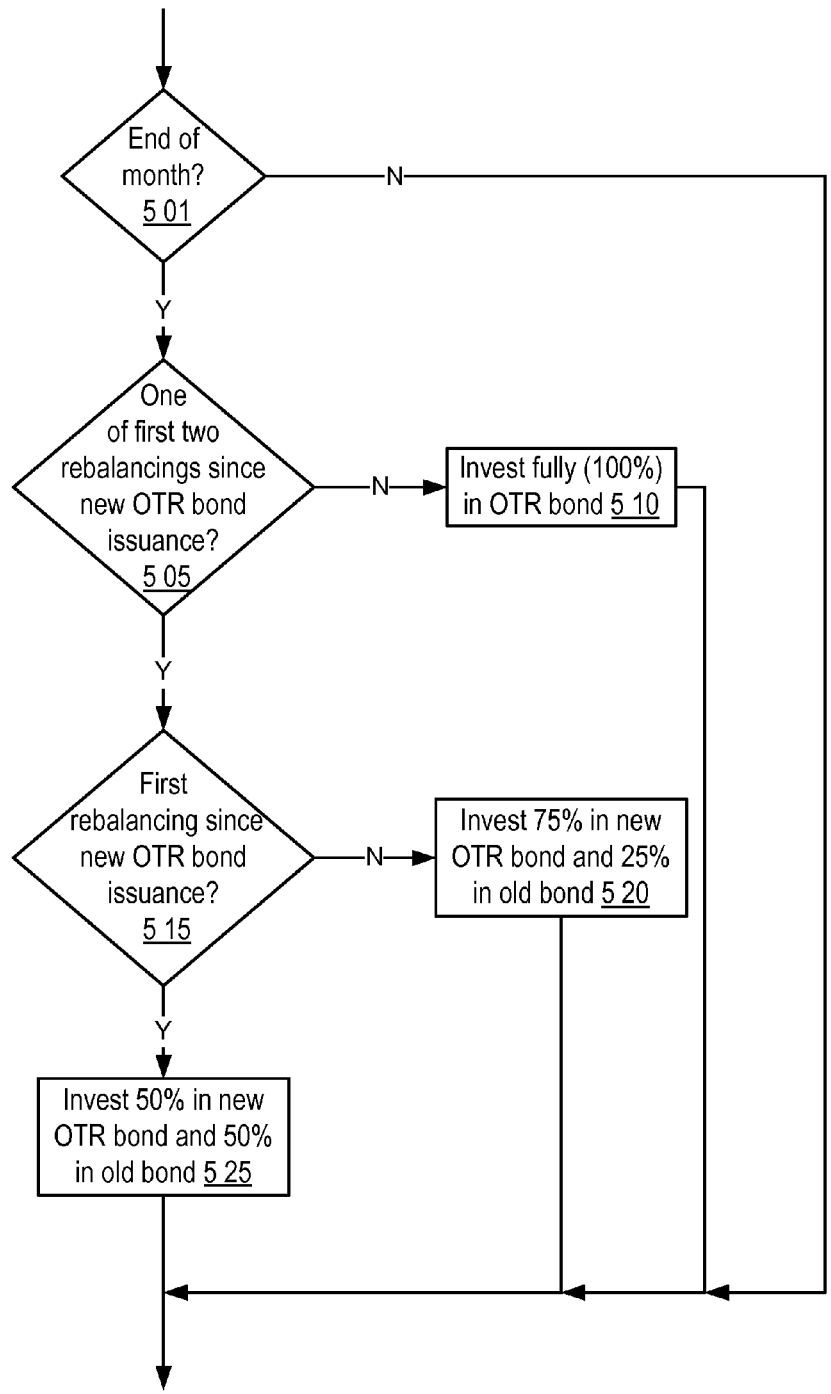
FIG. 5 shows aspects of logic flow for phased roll over of TIPS bond investments in one embodiment of ISIG operation.

The ISIG may undertake a phased roll subroutine, as described in one implementation in FIG. 5, to further manage the LTTP index and/or to administer the portfolio underlying the index.

FIG. 5 shows aspects of logic flow for phased roll over of TIPS bond investments in one embodiment of ISIG operation. As noted above, in some embodiments, the ISIG may implement a roll-over protocol to periodically allocate LTTP portfolio investments in TIPS bonds that are OTR. For example, in one implementation, at each rebalancing (which may occur, for example, at the end of each month), the ISIG may reinvest fully in the OTR TIPS bond regardless of when that bond was issued. FIG. 5 shows an alternative approach, where a phased-roll procedure is implemented. A phased roll into the most-recently issued OTR TIPS bond may facilitate a reduction in costs by minimizing transaction costs and may have one or more further advantages, such as avoiding market disruptions due to a large volume of trades, allowing for the trading of larger volumes of OTR bonds over time despite limited supply, and/or the like. A determination may be made as to whether the end of the month (or other rebalancing trigger time and/or condition) has been reached 501. If so, a determination may be made as to whether the current rebalancing is one of the first two rebalancings to occur since the issuance of the latest OTR TIPS bond in which the index portfolio is invested 505. If not (i.e., if the current rebalancing is the third or later rebalancing after that issuance), then the ISIG may invest fully (i.e., 100% of the portfolio value) in the latest OTR TIPS bond 510. On the other hand, if the current rebalancing is one of the first two after the most recent issuance, then a determination may be made as to whether the current rebalancing is the very first one following the issuance 515. If not (i.e., if the current rebalancing is the second rebalancing after the issuance), then 75% of the total portfolio value may be invested in the OTR TIPS bond, and 25% may be left invested in the old bond 520. On the other hand, if the current rebalancing is the first following issuance, then 50% of the portfolio value will be invested in the latest OTR bond, and 50% will be left invested in the old bond 525. It should be understood that the particular phased-roll protocol shown in FIG. 5 is for illustrative purposes only, and that other relative OTR and old bond weights, rebalancing schedules, rebalancing triggers, and/or the like are contemplated as being within the scope of ISIG operation.

Figure 6:
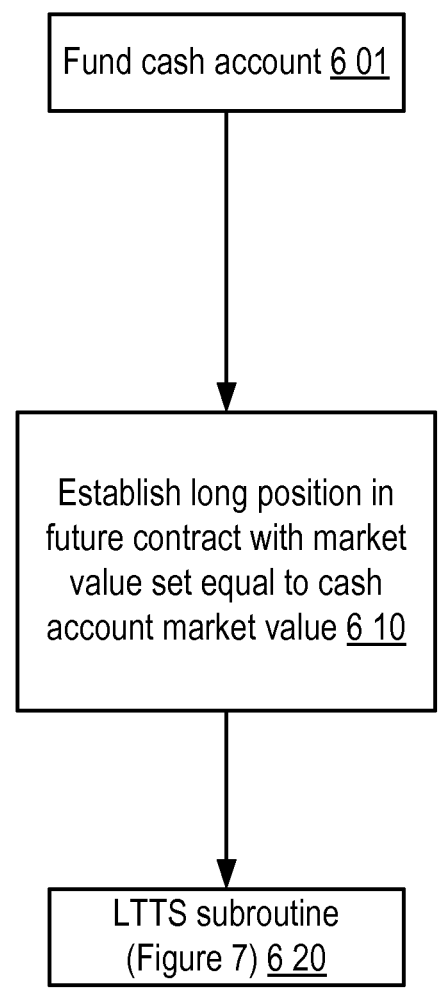
FIG. 6 shows aspects of logic flow for Long Term Treasury index generation and portfolio management in one embodiment of ISIG operation.

FIG. 6 shows aspects of logic flow for Long Term Treasury (LTTS) index generation and portfolio management in one embodiment of ISIG operation. In one implementation, an LTTS index may track an investment in the longest maturity sector for government bonds with the price transparency and liquidity of a futures contract. The LTTS index may, for example, mirror the investment returns of a long term US Treasury Security by tracking the price of the Ultra-Long U.S. Bond Futures. The LTTS index may further, in one implementation, be coupled with a money market return of investing in the Federal Funds Market. The ISIG may initially fund a cash account 601, such as a real cash account and/or a simulated and/or synthetic cash account. In one implementation, a simulated cash account with a normalized initial value (e.g., at 100 on the inception date of the index) may be established. A long position may then be established in the shortest term quarterly Long-Term "Ultra" U.S. Treasury Bond Futures contract with first delivery date greater than the following month with a market value for the position set equal to the market value of the cash position 610. The ISIG may then undertake the LTTS subroutine, as described in one implementation in FIG. 7, to further manage the LTTS index and/or to administer the portfolio underlying the index.

Figure 7:
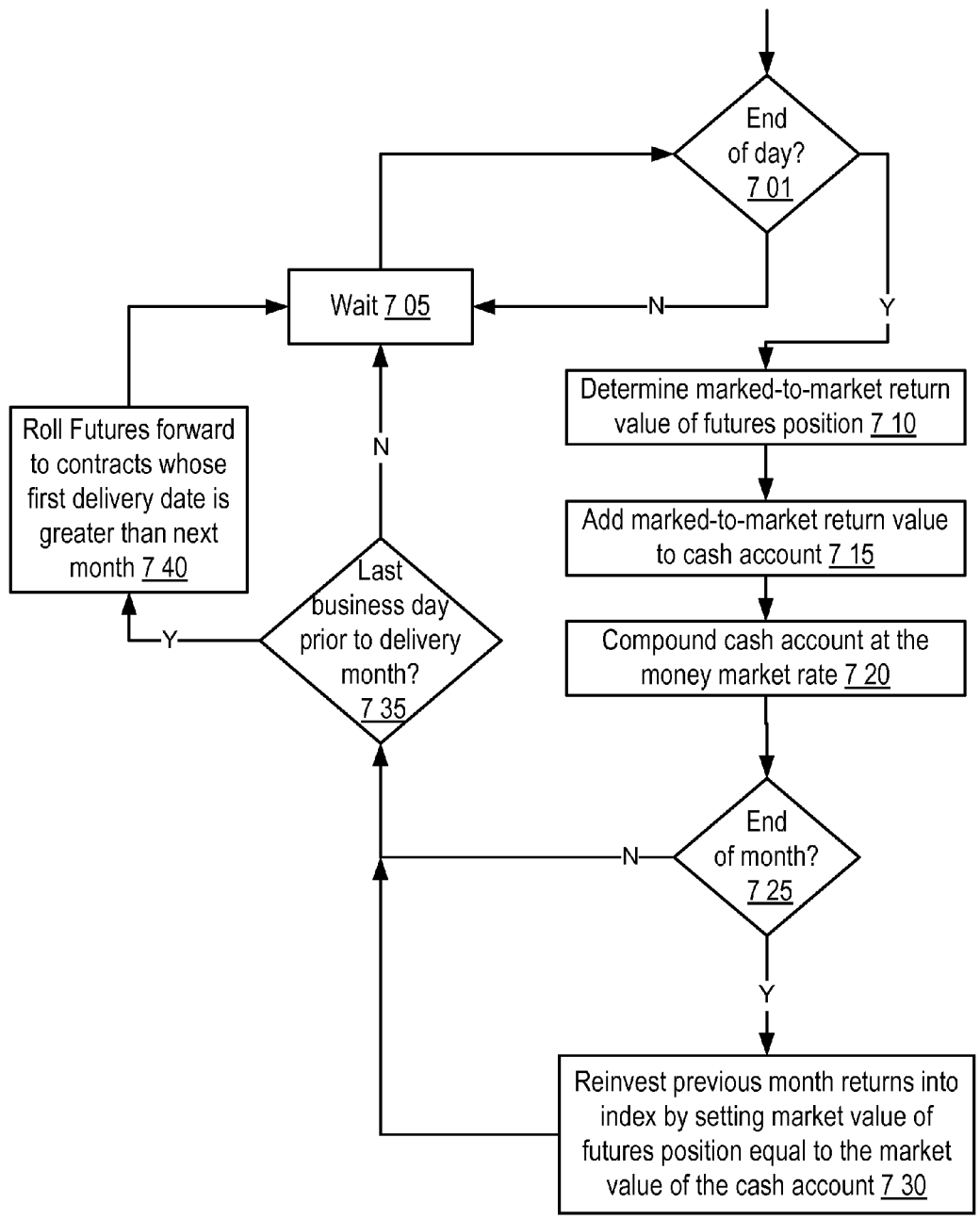
FIG. 7 shows aspects of logic flow for futures contract administration in one embodiment of ISIG operation.

FIG. 7 shows aspects of logic flow for futures contract administration in one embodiment of ISIG operation. A determination may be made as to whether the end of the day has been reached 701. If not, then the ISIG may wait for a period of time 705 before checking again for the end of day 701. Once the end of day has been reached, the ISIG may determine a marked-to-market return value of the LTTS index futures position 710. An amount equivalent to that marked-to-market return value may then be added to the cash account 715, such that the market value of the index on each day is equal to the market value of the cash account. The ISIG may further compound the cash account, such as at the money market rate 720. A determination may then be made as to whether the end of the month (or other selected rebalancing trigger time and/or condition) has been reached 725. If so, the previous months returns may be reinvested into the index by setting the market value of the futures position equal to the market value of the cash account 730.

In one embodiment, on the rebalancing day the market value of the futures position $M_f(o)$ equals the market value of the cash position of the index $C(o)$. The value of the cash position of the index on a day k consists of two components. The first is the cash position on the rebalancing day of the index reinvested daily at the money market rate. The second is the daily marked-to-market return from the futures position (the difference between market value of the futures position on day i and day i−1: $\Delta M_f(i) = M_f(i) - M_f(i-1)$) reinvested daily at the money market rate:

$$C(k) = C(0) \prod_{i=0}^{k-1}\left(1 + \frac{r_i * n_i}{360}\right) + \sum_{i=1}^{k-1}\left[\Delta M_f(i)\prod_{j=1}^{k-1}\left(1+\frac{r_j*n_j}{360}\right)\right] + \Delta M_f(k)$$

where $r_i$ is the money market interest rate on the $i^{th}$ business day of the month (the rate between day i and day i+1) and $n_i$ is the number of calendar days between business day i and business day i+1. The market value of the futures position $M_f(k)$ on day k is the number of futures contracts in the portfolio $N_f$ times the size of a contract $S_f$ times the price of a contract $P_f(k)$ as:

$$M_f(k) = N_f S_f P_f(k)$$

The value of the cash position on T+1 settlement basis $C^{T+1}(k)$ is computed using the money market rate. Since the money market rate from k to k+1 is not known at the closing of day k (the rate is quoted on the morning of the next day) we use the rate from k−1 to k as the expected value of the money market rate for day k. For the purpose of these calculations k−1 is the previous Fed Fund business day. Thus, the T+1 forward value of the cash position on day k is:

$$C^{T+1}(k) = C(k)\left(1 + \frac{r_{k-1}*n_k}{360}\right)$$

For return calculation, we use the market value of the index on the rebalancing day as a numeraire. The month-to-date return of the index on the $k^{th}$ business day of the month is:

$$R_I(k) = \frac{C^{T+1}(k) - C^{T+1}(0)}{C^{T+1}(0)} = R_f(k) + R_C(k)$$

where $R_f(k)$ is the relative day-to-day change in the futures price reinvested daily in the money market rate:

$$R_f(k) = \left[\sum_{i=1}^{k-1}\left[\frac{\Delta P_f(i)}{P_f(0)}\prod_{j=1}^{k-1}\left(1+\frac{r_j*n_j}{360}\right)\right]+\frac{\Delta P_f(k)}{P_f(0)}\right]\frac{\left(1+\frac{r_{i-1}*n_k}{360}\right)}{\left(1+\frac{r_0*n_0}{360}\right)}$$

and $R_C(k)$ is the relative month-to-date change of the cash component net reinvestment of the futures marked-to-market returns:

$$R_C(k) = \left[\prod_{i=0}^{k-1}\left(1+\frac{r_i*n_i}{360}\right)\right]\frac{\left(1+\frac{r_{k-1}*n_k}{360}\right)}{\left(1+\frac{r_0*n_0}{360}\right)} - 1$$

The daily return of the index is computed from two consecutive month-to-date returns $R_I(k-1)$ and $R_I(k)$ as:

$$R_I(k-1, k) = \frac{R_I(k)+1}{R_I(k-1)+1} - 1$$

A determination may also be made as to whether the last business day prior to the delivery date of the held futures contracts has been reached 735. If so, then the futures contracts may be rolled forward to contracts whose first delivery date is greater then the next month 740. Otherwise, the ISIG may return to 705. It should be noted that, though the embodiment of the LTTS index discussed herein is a fully funded index by virtue of the attendant cash position, other embodiments of the LTTS index that are partially funded or non-funded are also contemplated as being within the scope of the ISIG and its operation.

Figure 8:
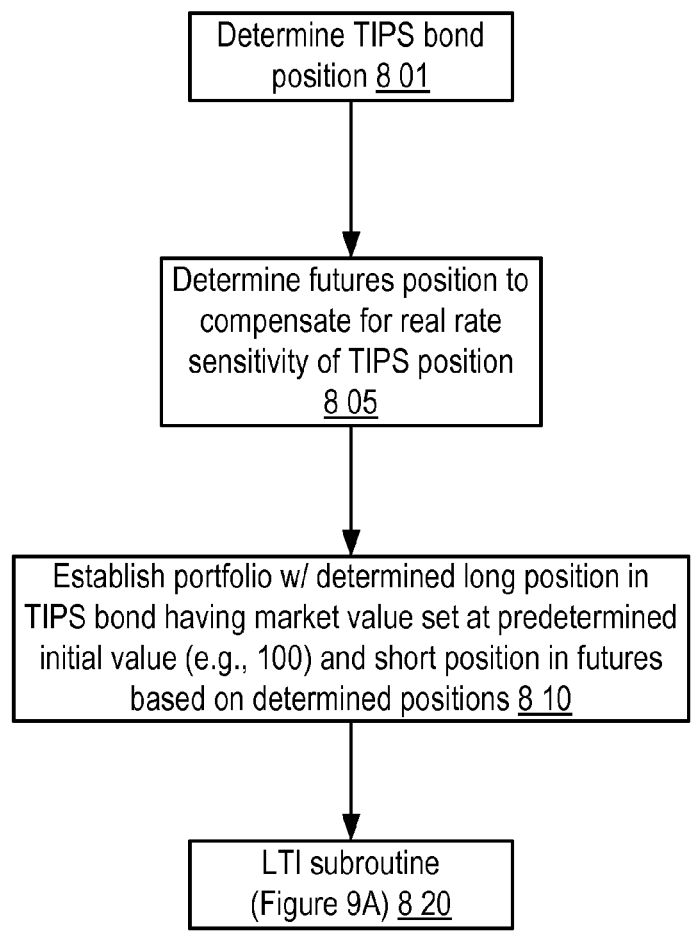
FIG. 8 shows aspects of logic flow for Long Term Inflation index generation and portfolio management in one embodiment of ISIG operation.

FIG. 8 shows aspects of logic flow for Long Term Inflation (LTI) index generation and portfolio management in one embodiment of ISIG operation. In one implementation, an LTI index may reflect changes in the long term inflation expectations embedded in a bond market, such as the U.S. Government bond market. Combining highly liquid and transparent instruments (e.g., the 30-year TIPS bond and the Ultra-Long U.S. Bond Futures contract), an LTI index may effectively replicate the market's expectation for future inflation. In some implementations, the LTI index may measure an investable return on the market expectation of inflation over a long time horizon (e.g., 30 years), thus providing greater volatility and, hence, greater possible returns than a comparable shorter time horizon instrument. In one implementation, the LTI index may incorporate an investment strategy to provide exposure to the inflation rate while minimizing funding costs and exposure to real rate risks, for example by taking a long position in the TIPS bond and a short position in the OTR futures contract. The TIPS bond is a real-yield instrument, where real yield may reflect the long term cost of risk-free capital net inflation, and thus represents an interest rate sensitivity without an inflation sensitivity. In contrast, the futures contract is sensitive to changes in nominal yield, where nominal yield may reflect changes in both inflation and real rate expectations. In the LTI index, the notional of the bond futures position may be chosen such that the real-rate exposure of the portfolio cancels out, leaving only the inflation risk exposure.

The ISIG may determine an initial TIPS bond position 801, such as may comprise a selection of one or more bonds, TIPS bonds (e.g., OTR 30 year TIPS bonds), and/or the like for composing a portfolio to underly and/or inform the value of an LTI index. A futures position may then be determined to compensate for real rate sensitivity of the TIPS position 805. In one implementation, if the market value of the TIPS position is $M_b$, the market value of the futures position $M_f$ may be chosen such that $$M_f D_f = M_b D_b \quad (1)$$

where $D_f$ and $D_b$ are the modified durations (defined as the percentage change in bond price given a 1% yield change) of the futures contract and of the TIPS bond respectively. The ISIG may then establish a portfolio with the determined long position in the TIPS bond having a market value set at a predetermined initial value (e.g., 100 at index inception) and the determined short position in the futures contract 810. In one implementation, a cash account may further be established in association with the futures position, similar to the cash account discussed above with reference to the LTTS index. The ISIG may then undertake the LTI subroutine (as shown in one implementation in FIG. 9A) 820.

Figure 9A:
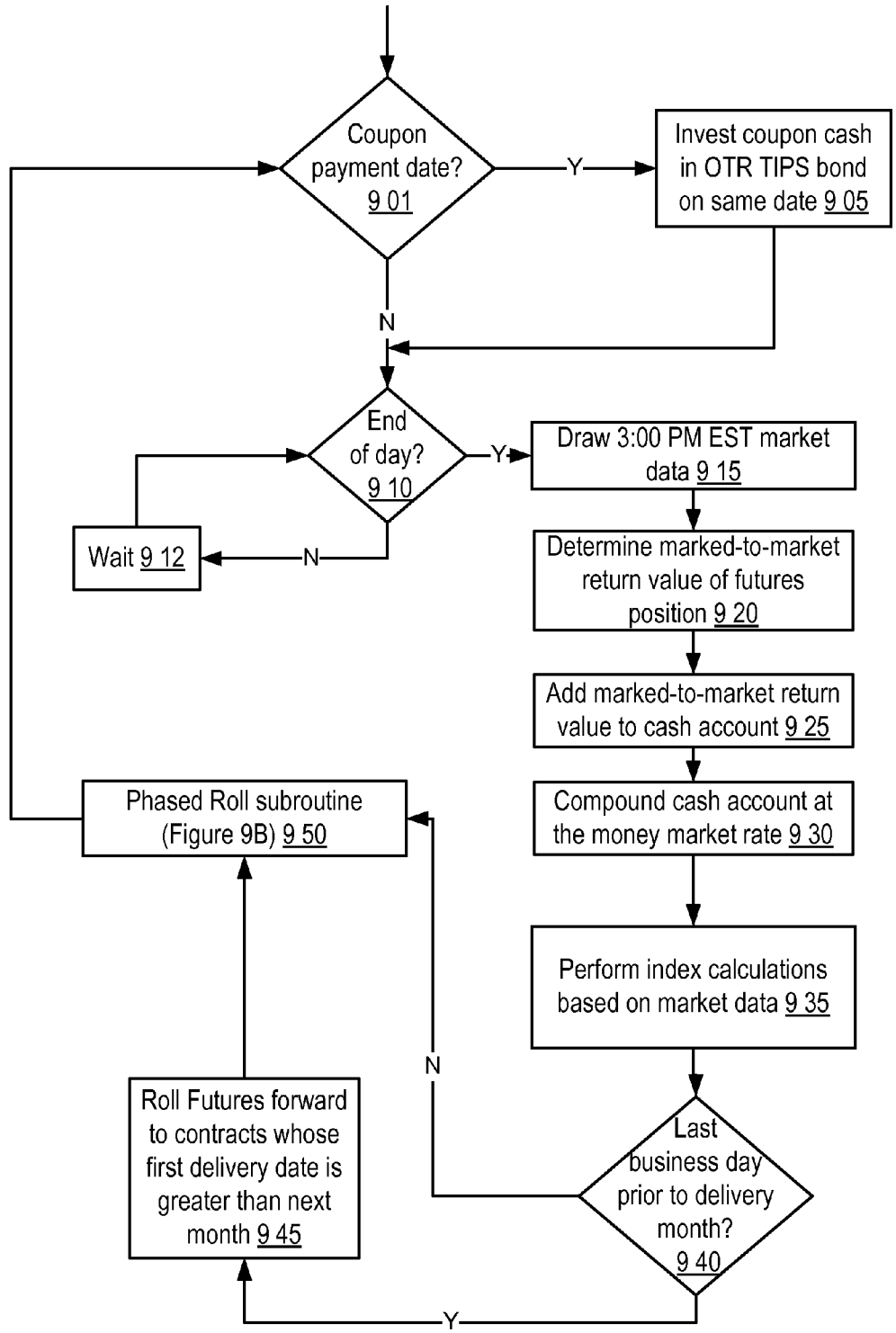
FIG. 9A shows aspects of logic flow for TIPS bond and futures contract administration in one embodiment of ISIG operation.

FIG. 9A shows aspects of logic flow for TIPS bond and futures contract administration in one embodiment of ISIG operation. A determination may be made as to whether the current date is a coupon payment date for the TIPS bonds underlying the index portfolio 901. If so, the coupon amount is reinvested in the OTR TIPS bonds (e.g., on the same date) 905. A determination may be made as to whether the end of the trading day has been reached (e.g., the close of trading of a specified exchange) 910. If not, then the ISIG may wait for a period of time 912 before checking again for the end of the day 910. Once the end of the day has been reached, market data from a pre-set time of day may be drawn (e.g., 3:00 PM EST on the same day) 915. The ISIG may determine a marked-to-market return value of the futures position underlying the LTI index 920. An amount equivalent to that marked-to-market return value may then be added to the corresponding cash account 925, such that the market value of the index on each day is equal to the market value of the cash account. The ISIG may further compound the cash account, such as at the money market rate 930. An index calculation may then be performed based on the drawn market data to determine the latest value of the LTI index, daily returns, and/or the like 935.

As noted above, in some embodiments, the ISIG may implement a roll-over protocol to periodically allocate LTI portfolio investments in OTR TIPS bonds. During the (e.g., three month) roll periods (when the index is rolled into a new OTR bond) the bond portfolio of the index consists of two bonds—On-The-Run and Off-The-Run. In one implementation, the index value may be computed using the two bond portfolio. For the period between rolls, the formulas may be used with the notional of the Off-The-Run bond set to zero $N_b \text{off}=o$.

The month-to-date return of the index on $k^{th}$ business day of the month is the difference between the market value of the index on that day $M_I(k)$ and the market value of the index on the last business day of the previous month $M_I(o)$, normalized to $M_I(o)$:

$$R_I(k) = \frac{M_I(k) - M_I(0)}{M_I(0)}$$

where the market value of the index is the sum of the market value of the TIPS position and the accumulated cash position from futures returns.

The market TIPS price is computed off the quoted real yield with the interest accrued from the previous coupon payment not included in the price (clean price). To compute the full price of the bond on the $k^{th}$ day, in one implementation, the accrued interest (AI) may be added to the quoted clean price and the result may be multiplied by the current inflation ratio $I_{inflation}(k)$:

$$P_b(k) = [P_{quoted}(k) + AI(k)] * I_{inflation}(k)$$

Thus, if no coupon is paid during the period, the month-to-date return of the index on day k is:

$$\overline{R}_b(k) = N_b \text{on} S_b \text{on}(P_b \text{on}(k) - P_b \text{on}(0)) + N_b \text{off} S_b \text{off}(P_b \text{off}(k) - P_b \text{off}(0))$$

where $N_b$ is the number of bonds, $S_b$, is the notional of a bond and $P_b(k)$ and $P_o(k)$ are the prices of the bond contract on the $k^{th}$ business day of the month and the last business day of the previous month respectively (immediately after rebalancing of the index), and subscript on or off indicates on-the-run or off-the-run bond type.

If a coupon is paid during the period, it is invested in OTR bond immediately based on the T+1 settlement guideline. If $k_c$ is the day for which bonds settle on the coupon payment day, on that day an additional amount of $N_b S_b C I_{inflation}(k_c)$ is invested in the OTR bond (where C is the coupon payment in dollars) and the new additional number of bonds in the index $\Delta N_b \text{on}$, can be computed from:

$$\Delta N_b \text{on} S_b \text{on} P_b \text{on}(k_c) = N_b S_b C I_{inflation}(k_c)$$

Thus, the new number of OTR bonds is:

$$N_b \text{on}(k_c) = N_b \text{on}(o) + \Delta N_b \text{on}$$

And the absolute month-to-date return of the bond component between coupon payment date and the next rebalancing date is:

$$\overline{R}_b(k) = N_b \text{on}(k_c) S_b \text{on} P_b \text{on}(k) - N_b \text{on}(0) S_b \text{on} P_b \text{on}(0) + N_b \text{off} S_b \text{off}(P_b \text{off}(k) - P_b \text{off}(0))$$

The absolute month-to-date return of the futures position on a $k^{th}$ business day of the month equals the accumulated cash position of the index on that day. The cash position is the sum of all daily marked-to-market returns from the futures continuously reinvested at the money market rate:

$$C(k) = \sum_{i=1}^{k-1}\left[\Delta M_f(i)\prod_{j=1}^{k-1}\left(1 + \frac{r_j * n_j}{360}\right)\right]\Delta M_f(k)$$

where $\Delta M_f(i) = M_f(i) - M_f(i-1)$ is the difference between market value of the futures position on day i and day i−1. $r_i$ is the money market interest rate on the $i^{th}$ business day of the month and $n_i$ is the number of calendar days between business day i and business day i+1.

To be compatible with the TIPS return calculations, the cash position is reported using a T+1 settlement guideline, with accrual occurring at the money market rate. Since the money market rate from k to k+1 is not known at the closing of day k (the rate is quoted on the morning of the next day) we use the rate from k−1 to k as the expected value of the money market rate for day k. For the purpose of these calculations k−1 is the previous Fed Fund business day. Thus, the T+1 forward value of the cash position on day k is:

$$C^{T+1}(k) = C(k)\left(1 + \frac{r_{k-1} * n_k}{360}\right)$$

The month to date absolute return of the futures position on the $k^{th}$ business day of the month $\overline{R}_f(k)$ is:

$$\overline{R}_f(k) = \left[\sum_{i=1}^{k-1}\left[\Delta M_f(i)\prod_{j=1}^{k-1}\left(1 + \frac{r_j * n_j}{360}\right)\right]\Delta M_f(k)\right]\left(1 + \frac{r_{k-1} * n_k}{360}\right)$$

The absolute month to date return of the index is the sum of absolute returns of the bond and the futures position:

$$\overline{R}_I(k) = \overline{R}_b(k) + N_f S_f\left[\sum_{i=1}^{k-1}\left[\Delta P_f(i)\prod_{j=1}^{k-1}\left(1 + \frac{r_j * n_j}{360}\right)\right]\Delta P_f(k)\right]\left(1 + \frac{r_{k-1} * n_k}{360}\right)$$

The relative month to date return of the index is computed using the market value of the bond position on the last business day of the previous month as a numeraire:

$$R_I(k) = \frac{\overline{R}_I(k)}{M_b(0)}$$

Using the formula for the absolute return of the index, this can be rewritten as:

$$R_I(k) = \frac{\overline{R}_b(k)}{M_b(0)} + \frac{N_f S_f\left[\sum_{i=1}^{k-1}\left[\Delta P_f(i)\prod_{j=1}^{k-1}\left(1 + \frac{r_j * n_j}{360}\right)\right]\Delta P_f(k)\right]\left(1 + \frac{r_{k-1} * n_k}{360}\right)}{M_b(0)}$$

If we define the relative return of the bond position as:

$$R_b(k) = \frac{\overline{R}_b(k)}{M_b(0)}\left(1 + \frac{r_{k-1} * n_k}{360}\right)$$

and the relative month to date return of the futures position on the $k^{th}$ business day of the month as:

$$R_f(k) = \left[\sum_{i=1}^{k-1}\left[\frac{\Delta P_f(i)}{P_f(0)}\prod_{j=1}^{k-1}\left(1 + \frac{r_j * n_j}{360}\right)\right] + \frac{\Delta P_f(k)}{P_f(0)}\right]\left(1 + \frac{r_{k-1} * n_k}{360}\right)$$

the relative month to date return of the index will be:

$$R_I(k) = R_b(k) + \frac{N_f S_f P_f(0)}{M_b(0)}R_f(k) = R_b(k) + \frac{M_f(0)}{M_b(0)}R_f(k) = R_b(k) + HR_f(k)$$

where H is the hedge ratio of the index computed at the last business day of the previous month.

The daily return of the index is computed from two consecutive month-to-date returns $R_I(k-1)$ and $R_I(k)$ as:

$$R_I(k-1, k) = \frac{R_I(k) + 1}{R_I(k-1) + 1} - 1$$

A determination may be made as to whether the last business day prior to the delivery date of the held futures contracts has been reached 940. If so, then the futures contracts may be rolled forward to contracts whose first delivery date is greater then the next month 945. The ISIG may undertake the phased roll subroutine, as described in one implementation in FIG. 9B, to further manage the LTI index and/or to administer the portfolio underlying the index.

Figure 9B:
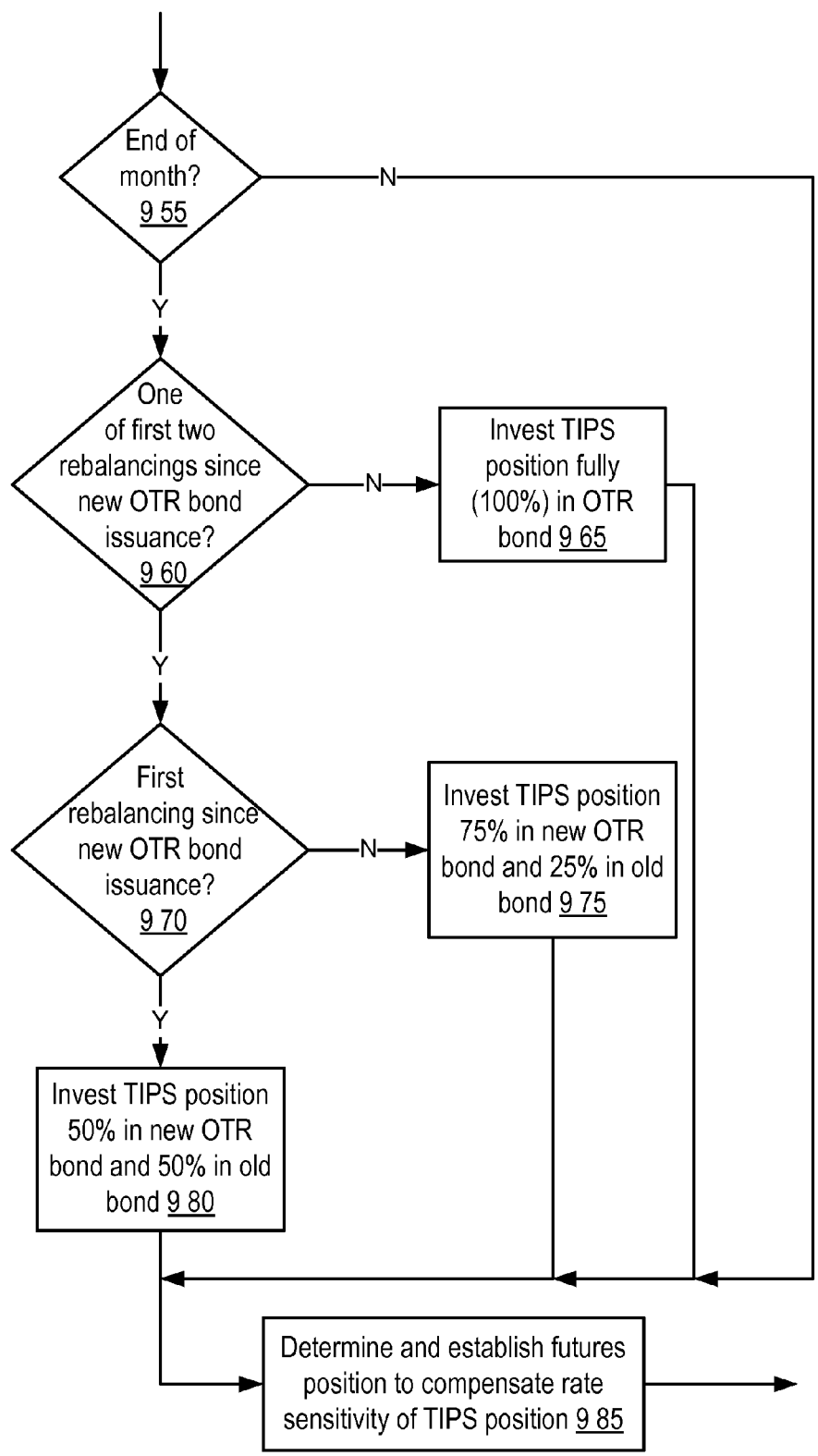
FIG. 9B shows aspects of logic flow for Long Term Inflation index portfolio rebalancing in one embodiment of ISIG operation.

FIG. 9B shows aspects of logic flow for Long Term Inflation index portfolio rebalancing in one embodiment of ISIG operation. A determination may be made as to whether the end of the month (or other rebalancing trigger time and/or condition) has been reached 955. If so, a determination may be made as to whether the current rebalancing is one of the first two rebalancings to occur since the issuance of the latest OTR TIPS bond in which the index portfolio is invested 960. If not (i.e., if the current rebalancing is the third or later rebalancing after that issuance), then the ISIG may invest fully (i.e., 100% of the value of the portfolio's TIPS position) in the latest OTR TIPS bond 965. On the other hand, if the current rebalancing is one of the first two after the most recent issuance, then a determination may be made as to whether the current rebalancing is the very first one following the issuance 970. If not (i.e., if the current rebalancing is the second rebalancing after the issuance), then 75% of the total value of the portfolio's TIPS position may be invested in the OTR TIPS bond, and 25% may be left invested in the old bond 975. On the other hand, if the current rebalancing is the first following issuance, then 50% of the value of the portfolio's TIPS position may be invested in the latest OTR bond, and 50% may be left invested in the old bond 980. The ISIG may then determine and establish a futures position to compensate the rate sensitivity of the established TIPS position 985. It should be understood that the particular phased-roll protocol shown in FIG. 9B is for illustrative purposes only, and that other relative OTR and old bond weights, rebalancing schedules, rebalancing triggers, and/or the like are contemplated as being within the scope of ISIG operation.

As noted above, any or all of the indices discussed herein may serve as the basis for a wide variety of different financial instruments and/or products whose value depends on the index values and/or returns. For example, in one implementation, a corporation may be formed having assets comprising the portfolio underlying one or more ISIG generated indices. Shares of that corporation may then be issued with values tied to the value of the index portfolios and, thus, to the index values. In another implementation, one or more derivatives and/or synthetic instruments may be generated based on a basis set of reference securities that are combined in proportions designed to mimic the behavior of an ISIG index. In still another implementation, the ISIG may instruct the creation of an open-end management investment company, a unit investment trust, and/or the like and issue shares of an exchange traded fund configured to track the value of an ISIG index. Other structures, instruments, products, derivatives, and/or the like are also contemplated as being within the scope of ISIG operation.

Figure 10:
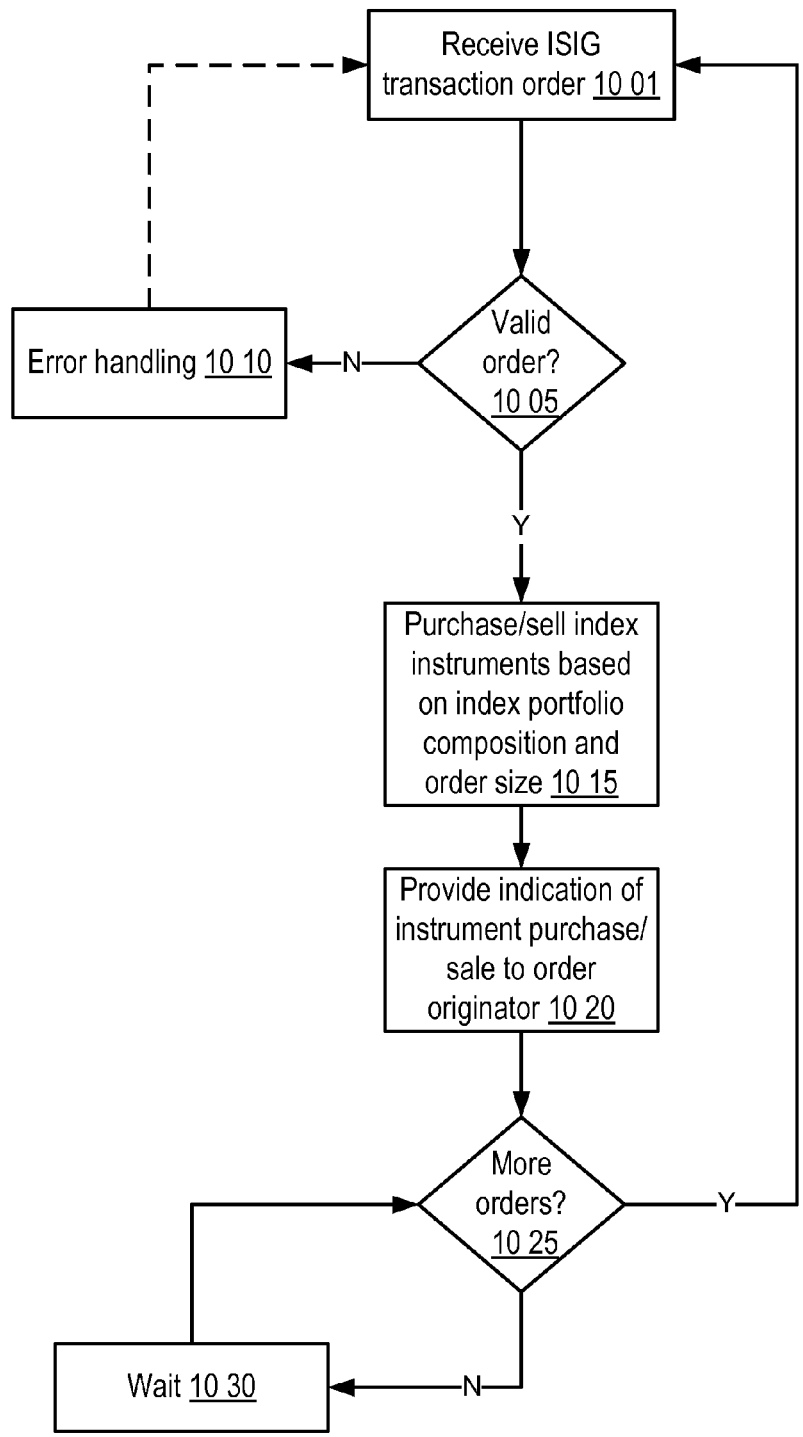
FIG. 10 shows aspects of logic flow for ISIG index product generation in one embodiment of ISIG operation.

FIG. 10 shows aspects of logic flow for ISIG index product generation in one embodiment of ISIG operation. The ISIG may receive a transaction order, such as may specify an index, a transaction instruction (e.g., purchase, sale, transaction timing and/or phases, and/or the like) and a transaction value, such as a number of shares, amount of cash, and/or the like 1001. In one implementation, a transaction order may further specify a payment method and/or mechanism, account identification, user identification, authentication information, and/or the like. A determination may be made as to whether the order is valid 1005. Such a determination may be based on a wide variety of different criteria in different implementations, such as the presence of sufficient information in the order to unambiguously effectuate the order, the successful authentication of the order originator, the availability and/or feasibility of the order, and/or the like. If the order is invalid, an error handling procedure may be undertaken, such as requesting the order originator to modify and/or resubmit the order. If the a valid order is received, the ISIG may purchase, sell, and/or otherwise transact instruments based on the composition of a portfolio corresponding to an index specified in the transaction order, where the amount of instruments transacted is based on the size of the order 1015. The ISIG may further provide an indication of the instrument transaction to the order originator 1020, such as may comprise a transaction confirmation, a collection of shares, an account update, and/or the like. A determination may be made as to whether additional orders exist 1025. If not, then the ISIG may wait for a period of time 1030 before checking again for further orders. If more orders are to be made, the ISIG may return to 1001.

ISIG Controller

Figure 11:
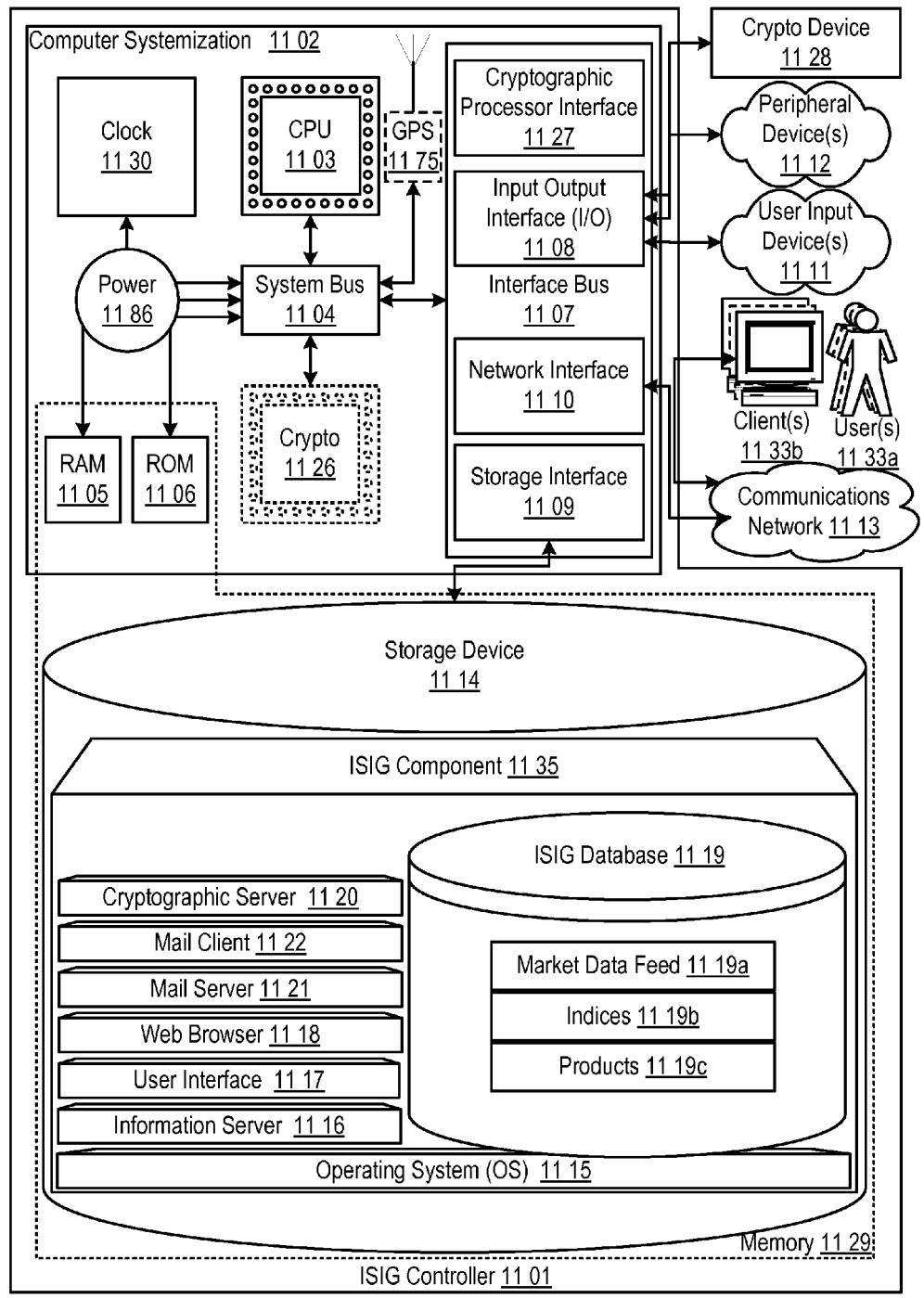
FIG. 11 is of a block diagram illustrating embodiments of the ISIG controller.

FIG. 11 illustrates inventive aspects of a ISIG controller 1101 in a block diagram. In this embodiment, the ISIG controller 1101 may serve to aggregate, process, store, search, serve, identify, instruct, generate, match, and/or facilitate interactions with a computer through inflation-sensitive index and associated financial product generation and management technologies, and/or other related data.

Typically, users, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ISIG controller 1101 may be connected to and/or communicate with entities such as, but not limited to: one or more users from user input devices 1111; peripheral devices 1112; an optional cryptographic processor device 1128; and/or a communications network 1113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ISIG controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) 1102 having conductive and/or otherwise transportive circuit pathways through which instructions (e.g., binary encoded signals) may travel to effect communications, operations, storage, etc. Optionally, the computer systemization may be connected to an internal power source 1186. Optionally, a cryptographic processor 1126 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the ISIG controller and beyond through various interfaces. Should processing requirements dictate a greater amount speed and/or capacity, distributed processors (e.g., Distributed ISIG), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the ISIG may be achieved by implementing a microcontroller such as CAST's R8051XC2 microcontroller; Intel's MCS 51 (i.e., 8051 microcontroller); and/or the like. Also, to implement certain features of the ISIG, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ISIG component collection (distributed or otherwise) and/or features may be implemented via the microprocessor and/or via embedded components; e.g., via ASIC, coprocessor, DSP, FPGA, and/or the like. Alternately, some implementations of the ISIG may be implemented with embedded components that are configured and used to achieve a variety of features or signal processing.

Depending on the particular implementation, the embedded components may include software solutions, hardware solutions, and/or some combination of both hardware/software solutions. For example, ISIG features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ISIG features. A hierarchy of programmable interconnects allow logic blocks to be interconnected as needed by the ISIG system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the ISIG may be developed on regular FPGAs and then migrated into a fixed version that more resembles ASIC implementations. Alternate or coordinating implementations may migrate ISIG controller features to a final ASIC instead of or in addition to FPGAs. Depending on the implementation all of the aforementioned embedded components and microprocessors may be considered the "CPU" and/or "processor" for the ISIG.

Power Source

The power source 1186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the ISIG thereby providing an electric current to all subsequent components. In one example, the power source 1186 is connected to the system bus component 1104. In an alternative embodiment, an outside power source 1186 is provided through a connection across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Through a communications network 1113, the ISIG controller is accessible through remote clients 1133b (e.g., computers with web browsers) by users 1133a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed ISIG), architectures may similarly be employed to pool, load balance, and/or otherwise increase the communicative bandwidth required by the ISIG controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1110 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 may be card readers, dongles, finger print readers, gloves, graphics tablets, joysticks, keyboards, mouse (mice), remote controls, retina readers, trackballs, trackpads, and/or the like.

Peripheral devices 1112 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the ISIG controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the ISIG controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the ISIG controller and/or a computer systemization may employ various forms of memory 1129. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1129 will include ROM 1106, RAM 1105, and a storage device 1114. A storage device 1114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1129 may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the ISIG component(s) 1135; and/or the like (i.e., collectively a component collection). These components may be stored and accessed from the storage devices and/or from storage devices accessible through an interface bus. Although non-conventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the ISIG controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ISIG controller to communicate with other entities through a communications network 1113. Various communication protocols may be used by the ISIG controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ISIG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ISIG database 1119, operating systems, other program components, user interfaces, Web browsers, and/or the like.

Access to the ISIG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ISIG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ISIG as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the ISIG enabled nodes. The combined application may be nugatory on systems employing standard Web browsers.

Mail Server

A mail server component 1121 is a stored program component that is executed by a CPU 1103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ISIG.

Access to the ISIG mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1122 is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1120 is a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ISIG may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ISIG component to engage in secure transactions if so desired. The cryptographic component facilitates the secure accessing of resources on the ISIG and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ISIG Database

The ISIG database component 1119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ISIG database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the ISIG database is implemented as a data-structure, the use of the ISIG database 1119 may be integrated into another component such as the ISIG component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119*a-c*. A market data table 1119*a* may include fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. An indices table 1119*b* may include fields such as, but not limited to: index_ID, index_name, components, values, history, portfolio_ID, portfolio_components, portfolio_weights, portfolio_values, product_ID(s), restrictions and/or authorizations, index_profile, and/or the like. A products table 1119*c* may include fields such as, but not limited to: product_ID, product_name, index_ID(s), terms, restrictions, transaction_history, values, chain_of_title, and/or the like.

In one embodiment, the ISIG database may interact with other database systems. For example, employing a distributed database system, queries and data access by search ISIG component may treat the combination of the ISIG database, an integrated data security layer database as a single database entity.

In one embodiment, user programs may contain various user interface primitives, which may serve to update the ISIG. Also, various accounts may require custom database tables depending upon the environments and the types of clients the ISIG may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1119a-c. The ISIG may be configured to keep track of various settings, inputs, and parameters via database controllers.

The ISIG database may communicate to and/or with other components in a component collection, including itself, and/or facilities of the like. Most frequently, the ISIG database communicates with the ISIG component, other program components, and/or the like. The database may contain, retain, and provide information regarding other nodes and data.

The ISIGs

The ISIG component 1135 is a stored program component that is executed by a CPU. In one embodiment, the ISIG component incorporates any and/or all combinations of the aspects of the ISIG that was discussed in the previous figures. As such, the ISIG affects accessing, obtaining and the provision of information, services, transactions, and/or the like across various communications networks.

The ISIG component enables the determination of weights for constituents of index-linked financial portfolios, the acquisition and/or maintenance/management of those constituents (e.g., on-the-run 30 year TIPS bond, shortest term quarterly Long-Term "Ultra" U.S. Treasury Bond Futures, and/or the like), the determination of market values and/or returns associated with the indices, the generation of financial products based on the indices, and/or the like and use of the ISIG.

The ISIG component enabling access of information between nodes may be developed by employing standard development tools and languages such as, but not limited to: Apache components, Assembly, ActiveX, binary executables, (ANSI) o (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the ISIG server employs a cryptographic server to encrypt and decrypt communications. The ISIG component may communicate to and/or with other components in a component collection, including itself, and/or facilities of the like. Most frequently, the ISIG component communicates with the ISIG database, operating systems, other program components, and/or the like. The ISIG may contain, communicate, generate, obtain, and/or provide program component, system, user, and/or data communications, requests, and/or responses.

Distributed ISIGs

The structure and/or operation of any of the ISIG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ISIG controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment. The following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:
http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and improve over previous works, the application is directed to APPARATUSES, METHODS AND SYSTEMS FOR AN INFLATION-SENSITIVE INDEX AND ASSOCIATED FINANCIAL PRODUCT GENERATOR. The entirety of this application (including the Cover Page, Title, Headings, Field, Background, Summary, Brief Description of the Drawings, Detailed Description, Claims, Abstract, Figures, Appendices, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a ISIG individual and/or enterprise user, database configuration and/or relational model, data type, data transmission and/or network framework, syntax structure, and/or the like, various embodiments of the ISIG, may be implemented that enable a great deal of flexibility and customization. For example, aspects of the ISIG may be adapted for tracking modified inflationary indices, multiple and/or foreign inflation rates, generating financial products with different positions with respect to inflationary futures, and/or the like. While various embodiments and discussions of the ISIG have been directed to long term inflationary indices and associated tradable financial products, however, it is to be understood that the embodiments described herein may be readily configured and/or customized for a wide variety of other applications and/or implementations.

What is claimed is:

1. A long-term inflation index instrument generating processor-implemented method, comprising:
   establishing in an index portfolio a long position in on-the-run long-term treasury inflation-protected securities;
   determining via a processor a notional of a long-term treasury bond futures position that cancels a real rate exposure of the long position;
   establishing in the index portfolio a short position in on-the-run long-term treasury bond futures based on the determined notional;
   generating a long-term inflation index having an index value tied to the index portfolio;
   generating at least one financial instrument having an instrument value that depends on the long-term inflation index; and
   providing the at least one financial instrument in a market exchange.

2. The method of claim 1, further comprising: periodically rebalancing the index portfolio.

3. The method of claim 2, wherein rebalancing the portfolio further comprises: performing a phased roll of an investment amount associated with the index portfolio into a newly issued on-the-run treasury inflation-protected security.

4. The method of claim 1, wherein the determining via a processor a notional of a long-term treasury bond futures position that cancels a real rate exposure of the long position further comprises: determining a market value of the long-term treasury bond futures position as a product of a market value of the on-the-run long-term treasury inflation-protected securities position and a ratio of the duration of the on-the-run long-term treasury inflation-protected securities position and the duration of the long-term treasury bond futures position.

5. The method of claim 1, wherein the at least one financial instrument is an exchange traded fund.

6. A long-term treasury inflation-protected security index instrument generating processor-implemented method, comprising:
    establishing in an index portfolio a long position in on-the-run long-term treasury inflation-protected securities;
    generating via a processor a long-term treasury inflation-protected security index having an index value tied to the index portfolio;
    generating at least one financial instrument having an instrument value that depends on the long-term treasury inflation-protected security index;
    providing the at least one financial instrument in a market exchange;
    reinvesting coupon payouts associated with the long-term treasury inflation-protected security back into the index portfolio; and
    performing a phased roll of an investment amount associated with the index portfolio into a newly issued on-the-run treasury inflation-protected security.

7. A long-term treasury index instrument generating processor-implemented method, comprising:
    establishing a funded cash account;
    setting a market value of a long position in on-the-run long-term treasury bond futures equal to a value of the funded cash account;
    establishing in an index portfolio the long position in on-the-run long-term treasury bond futures;
    generating via a processor a long-term treasury index having an index value tied to the index portfolio;
    generating at least one financial instrument having an instrument value that depends on the long-term treasury inflation-protected security index;
    providing the at least one financial instrument in a market exchange;
    periodically determining a marked-to-market return value of the long position;
    adding the marked-to-market return value to the funded cash account; and
    periodically compounding the funded cash account at the money market rate.

8. A long-term inflation index instrument generating apparatus, comprising:
    a memory;
    a processor disposed in communication with said memory, and configured to issue a plurality of processing instructions stored in the memory, wherein the processor issues instructions to:
        establish in an index portfolio a long position in on-the-run long-term treasury inflation-protected securities;
        determine a notional of a long-term treasury bond futures position that cancels a real rate exposure of the long position;
        establish in the index portfolio a short position in on-the-run long-term treasury bond futures based on the determined notional;
        generate a long-term inflation index having an index value tied to the index portfolio;
        generate at least one financial instrument having an instrument value that depends on the long-term inflation index; and
        provide the at least one financial instrument in a market exchange.

9. A long-term inflation index instrument generating processor-readable physical medium storing processor-issuable-and-generated instructions to:
    establish in an index portfolio a long position in on-the-run long-term treasury inflation-protected securities;
    determine a notional of a long-term treasury bond futures position that cancels a real rate exposure of the long position;
    establish in the index portfolio a short position in on-the-run long-term treasury bond futures based on the determined notional;
    generate a long-term inflation index having an index value tied to the index portfolio;
    generate at least one financial instrument having an instrument value that depends on the long-term inflation index; and
    provide the at least one financial instrument in a market exchange.

10. A long-term inflation index instrument generating system, comprising:
    means for establishing in an index portfolio a long position in on-the-run long-term treasury inflation-protected securities;
    means for determining a notional of a long-term treasury bond futures position that cancels a real rate exposure of the long position;
    means for establishing in the index portfolio a short position in on-the-run long-term treasury bond futures based on the determined notional;
    means for generating a long-term inflation index having an index value tied to the index portfolio;
    means for generating at least one financial instrument having an instrument value that depends on the long-term inflation index; and
    means for providing the at least one financial instrument in a market exchange.

11. A long-term treasury inflation-protected security index instrument generating apparatus, comprising:
    a memory;
    a processor disposed in communication with said memory, and configured to issue a plurality of processing instructions stored in the memory, wherein the processor issues instructions to:
        establish in an index portfolio a long position in on-the-run long-term treasury inflation-protected securities;
        generate a long-term treasury inflation-protected security index having an index value tied to the index portfolio;
        generate at least one financial instrument having an instrument value that depends on the long-term treasury inflation-protected security index;
        provide the at least one financial instrument in a market exchange;
        reinvest coupon payouts associated with the long-term treasury inflation-protected security back into the index portfolio; and
        perform a phased roll of an investment amount associated with the index portfolio into a newly issued on-the-run treasury inflation-protected security.

12. A long-term treasury inflation-protected security index instrument generating processor-readable physical medium storing processor-issuable-and-generated instructions to:

establish in an index portfolio a long position in on-the-run long-term treasury inflation-protected securities;

generate a long-term treasury inflation-protected security index having an index value tied to the index portfolio;

generate at least one financial instrument having an instrument value that depends on the long-term treasury inflation-protected security index;

provide the at least one financial instrument in a market exchange;

reinvest coupon payouts associated with the long-term treasury inflation-protected security back into the index portfolio; and perform a phased roll of an investment amount associated with the index portfolio into a newly issued on-the-run treasury inflation-protected security.

13. A long-term treasury inflation-protected security index instrument generating system, comprising:

means for establishing in an index portfolio a long position in on-the-run long-term treasury inflation-protected securities;

means for generating a long-term treasury inflation-protected security index having an index value tied to the index portfolio;

means for generating at least one financial instrument having an instrument value that depends on the long-term treasury inflation-protected security index;

means for providing the at least one financial instrument in a market exchange;

means for reinvesting coupon payouts associated with the long-term treasury inflation-protected security back into the index portfolio; and means for performing a phased roll of an investment amount associated with the index portfolio into a newly issued on-the-run treasury inflation-protected security.

14. A long-term treasury index instrument generating apparatus, comprising:

a memory;

a processor disposed in communication with said memory, and configured to issue a plurality of processing instructions stored in the memory, wherein the processor issues instructions to:

establish a funded cash account;

set a market value of a long position in on-the-run long-term treasury bond futures equal to a value of the funded cash account;

establish in an index portfolio the long position in on-the-run long-term treasury bond futures;

generate a long-term treasury index having an index value tied to the index portfolio;

generate at least one financial instrument having an instrument value that depends on the long-term treasury inflation-protected security index;

provide the at least one financial instrument in a market exchange;

periodically determine a marked-to-market return value of the long position;

add the marked-to-market return value to the funded cash account; and periodically compound the funded cash account at the money market rate.

15. A long-term treasury index instrument generating processor-readable physical medium storing processor-issuable-and-generated instructions to:

establish a funded cash account;

set a market value of a long position in on-the-run long-term treasury bond futures equal to a value of the funded cash account;

establish in an index portfolio the long position in on-the-run long-term treasury bond futures;

generate a long-term treasury index having an index value tied to the index portfolio;

generate at least one financial instrument having an instrument value that depends on the long-term treasury inflation-protected security index;

provide the at least one financial instrument in a market exchange;

periodically determine a marked-to-market return value of the long position;

add the marked-to-market return value to the funded cash account; and periodically compound the funded cash account at the money market rate.

16. A long-term treasury index instrument generating system, comprising:

means for establishing a funded cash account;

means for setting a market value of a long position in on-the-run long-term treasury bond futures equal to a value of the funded cash account;

means for establishing in an index portfolio the long position in on-the-run long-term treasury bond futures;

means for generating a long-term treasury index having an index value tied to the index portfolio;

means for generating at least one financial instrument having an instrument value that depends on the long-term treasury inflation-protected security index;

means for providing the at least one financial instrument in a market exchange;

means for periodically determining a marked-to-market return value of the long position;

means for adding the marked-to-market return value to the funded cash account; and means for periodically compounding the funded cash account at the money market rate.

* * * * *